US00RE48005E

(19) United States
(12) Reissued Patent
Seo et al.

(10) Patent Number: US RE48,005 E
(45) Date of Reissued Patent: May 19, 2020

(54) METHOD FOR AVOIDING INTERFERENCE

(71) Applicant: LG ELECTRONICS INC., Seoul (KR)

(72) Inventors: Han-Byul Seo, Anyang (KR); Byoung-Hoon Kim, Anyang (KR)

(73) Assignee: LG ELECTRONICS INC., Seoul (KR)

(21) Appl. No.: 15/294,412

(22) Filed: Oct. 14, 2016

Related U.S. Patent Documents

Reissue of:
(64) Patent No.: 8,774,014
Issued: Jul. 8, 2014
Appl. No.: 13/148,746
PCT Filed: Feb. 12, 2010
PCT No.: PCT/KR2010/000917
§ 371 (c)(1),
(2) Date: Aug. 10, 2011
PCT Pub. No.: WO2010/093205
PCT Pub. Date: Aug. 19, 2010

U.S. Applications:
(63) Continuation of application No. 14/669,955, filed on Mar. 26, 2015, now Pat. No. Re. 47,099, which is an application for the reissue of Pat. No. 8,774,014.
(Continued)

(51) Int. Cl.
*H04W 72/08* (2009.01)
*H04B 7/26* (2006.01)
(Continued)

(52) U.S. Cl.
CPC ..... *H04W 72/082* (2013.01); *H04B 7/2606* (2013.01); *H04W 72/0426* (2013.01); *H04W 84/047* (2013.01)

(58) Field of Classification Search
CPC ..... H04W 84/047; H04W 72/082; H04W 72/0426; H04B 7/2606
(Continued)

(56) References Cited

U.S. PATENT DOCUMENTS

2007/0155395 A1* 7/2007 Gopalakrishnan .... H04W 28/18 455/453
2008/0107035 A1* 5/2008 Zhu et al. ..... 370/241
(Continued)

*Primary Examiner* — Mark Sager
(74) *Attorney, Agent, or Firm* — Birch, Stewart, Kolasch & Birch, LLP

(57) ABSTRACT

The present invention provides a method for avoiding interference resulting from data transmission between an adjacent second base station and a second relay station placed within the coverage of the adjacent second base station. The method for avoiding interference comprises: receiving the radio resource scheduling information from the adjacent second base station; checking the radio resources used in the data transmission between the adjacent second base station and the second relay station based on the received radio resource scheduling information; and scheduling at least one radio resource among uplink radio resources and downlink radio resources for at least one first terminal and at least one first relay station which are connected to a first base station in order to avoid interference with the checked radio resource if the radio resource used in the data transmission from the second base station to the second relay station is checked as the uplink resource or if the radio resource used in the data transmission from the second relay station to the second base station is checked as the downlink resource.

5 Claims, 9 Drawing Sheets

Related U.S. Application Data

(60) Provisional application No. 61/163,040, filed on Mar. 25, 2009, provisional application No. 61/151,847, filed on Feb. 12, 2009.

(51) Int. Cl.
*H04W 72/04* (2009.01)
*H04W 84/04* (2009.01)

(58) Field of Classification Search
USPC ..... 370/246; 455/450
See application file for complete search history.

(56) References Cited

U.S. PATENT DOCUMENTS

| | | | | |
|---|---|---|---|---|
| 2008/0153535 | A1* | 6/2008 | Gorokhov ..... | H04W 52/367 455/522 |
| 2008/0194267 | A1* | 8/2008 | Ahn et al. ..... | 455/450 |
| 2008/0260000 | A1 | 10/2008 | Periyalwar et al. | |
| 2009/0197588 | A1* | 8/2009 | Khandekar ..... | H04W 72/082 455/422.1 |

* cited by examiner (a)

(b)

METHOD FOR AVOIDING INTERFERENCE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application *is a Continuation Reissue application of U.S. application Ser. No. 14/669,955 filed on Mar. 26, 2015, which is a Reissue application of U.S. Pat. No. 8,774,014 issued on Jul. 8, 2014, which* is the National Phase of PCT/KR2010/000917 filed on Feb. 12, 2010, which claims priority under 35 U.S.C. 119(e) to U.S. Provisional Application Nos. 61/151,847 filed on Feb. 12, 2009 and 61/163,040 filed on Mar. 25, 2009, all of which are hereby expressly incorporated by reference into the present application. *More than one reissue application has been filed for the reissue of U.S. Pat. No. 8,774,014: the present application and U.S. application Ser. No. 14/669,955.*

TECHNICAL FIELD

The present invention relates to radio communications, and more particularly, to a method for avoiding interference due to the addition of a relay station in a radio communications system.

BACKGROUND ART

A radio communications system may be largely categorized into an FDD (Frequency Division Duplex) scheme and a TDD (Time Division Duplex) scheme.

According to the FDD scheme, an uplink transmission and a downlink transmission are performed through different frequency bands. According to the TDD scheme, an uplink transmission and a downlink transmission are performed through the same frequency band and at different times. According to the TDD scheme, channel responses are substantially reciprocal to each other. This means that a downlink channel response and an uplink channel response are almost the same in a given frequency region. Accordingly, in a TDD-based radio communications system, a downlink channel response can be acquired from an uplink channel response.

According to the TDD method, an entire frequency band undergoes time division into an uplink transmission and a downlink transmission. Therefore, a downlink transmission by a base station (BS) and an uplink transmission by a mobile station (MS) cannot be simultaneously performed. In a TDD system where an uplink transmission and a downlink transmission are differentiated from each other in the unit of subframes, an uplink transmission and a downlink transmission are performed on different subframes.

A radio communications system includes a base station (BS) which provides a service to neighboring cells. Generally, a terminal or a mobile station (MS) can communicate with the BS when being within the service coverage of the BS. However, when there is an obstacle such as a building or when the terminal or the MS is positioned at a cell boundary, the MS cannot perform a communication with the BS or can perform a communication with an inferior communication quality.

In order to extend the service coverage of the BS, there have been proposed various methods.

One of the various methods is to introduce a relay station (RS) to the radio communications system. The RS is operated as an intermediary between the BS and the MS (or between two MSs and between MS/BS and another RS). More concretely, the RS allows data to be transferred between the BS and the MS far therefrom through two hops or multi hops, not through a single link for direct transfer. This RS may extend the service coverage of the BS, and may enhance a cell boundary performance. Furthermore, the RS may enhance a cell throughput.

The RS was firstly developed from a time division duplex (TDD) radio communications system such as Mobile WiMAX (e.g., IEEE 802.16j/m).

In order to enhance the performance, a Frequency Division Duplex (FDD) radio communications system has started to research about the introduction of a relay station. The FDD radio communications system may include an FDD-based 3GPP (Generation Project Partnership) LTE (Long Term Evolution) system, or a Mobile WiMAX system for supporting FDD, etc.

FIG. 1 illustrates a radio communications system using a relay station.

As shown, the radio communications system includes one or more base stations (BS) 21, 22 and 23.

Each base station 21, 22 and 23 provides a communications service to a specific geographical area (cell) 21a, 22a and 23a. The cell may be divided into a plurality of areas (sectors). One base station may include one or more cells.

The base stations 21, 22 and 23 indicate fixed stations communicating with terminals 11, 12 and 13, and may be called eNB (evolved-NodeB), BTS (Base Transceiver System), Access Point, AN (Access Network), etc.

Hereinafter, a downlink (DL) indicates a communication to a terminal from a base station, and an uplink (UL) indicates a communication from a terminal to a base station. In the DL, a transmitter may be part of a base station, and a receiver may be part of a terminal. In the UL, a transmitter may be part of a terminal, and a receiver may be part of a base station.

In uplink transmission, the terminal 11 is operated as a source station, and transmits data to the base station serving as a destination station. In downlink transmission, the base station 21 is operated as a source station, and transmits data to the terminal 11 serving as a destination station.

As shown, the radio communications system may include one or more relay stations 31, 32 and 33.

As shown, the relay stations are positioned on an outer periphery area or a shadow area of a cell, and relays data between the base station and the terminal. Here, the base station performs functions such as connectivity, management, control and resource allocations between the relay station and the terminal.

Referring to FIG. 2, the base station performs a communication with the terminal through the relay station.

As shown, the relay station 31 relays the UL and the DL.

In UL transmission, the terminal 11 serving as a source station o transmits UL data to a destination station, i.e., the base station 21 and the relay station 31. Then, the relay station 31 relays the UL data of the terminal 11 to the base station 21.

In DL transmission, the base station 21 serving as a source station transmits DL data to a destination source, i.e., the terminal 11 and the relay station 31. Then, the relay station 31 relays data from the source station (the base station 21) to the destination station (the terminal 11).

As shown, the relay station may be implemented in one or plurality in number. That is, the relay stations 32 and 33 may exist between the base station and the terminal 12.

The relay station may adopt a relaying scheme such as an AF (amplify and forward) scheme and a DF (decode and forward) scheme.

FIGS. 3 and 4 illustrate influences by interference due to the introduction of a relay.

As can be seen from FIG. 3A, the relay station 30 is connected to the first base station 21. The first terminal 11 is placed within the coverage of the first base station 21, and performs communications with the first base station 21. And, the second terminal 12 is placed within the coverage of the relay station 30, and performs communications with the relay station 30.

When the relay station 30 connected to the first base station 21 transmits DL data to the second terminal 12, the DL from the first base station 21 to the first terminal 11 may be interfered.

As can be seen from FIG. 3B, the first base station 21 and the second base station 22 are adjacent to each other. And, the relay station 30 is positioned on an outer periphery region of the coverage of the first base station 21. In the case that the first base station 21 transmits backhaul data to the relay station in the DL, the first base station 21 transmits the backhaul data with high transmission power since the relay station 30 is positioned on the outer periphery region. Here, the DL from the second base station 22 to the second terminal 12 is interfered by the backhaul data transmitted with high transmission power.

Referring to FIG. 4, the first relay station 31 and the second relay station 32 are connected to the first base station 21. The first terminal 11 is connected to the first relay station 31, and the second terminal 32 is connected to the second relay station.

If the first base station 21 transmits backhaul data to the first relay station 31 in the DL, the DL from the second relay station 32 to the second terminal 12 may be interfered. On the contrary, if the second relay station 32 transmits backhaul data to the second terminal in the DL, the DL from the first base station 21 to the first relay station 31 may be interfered.

DISCLOSURE OF THE INVENTION

Therefore, the present invention is to solve the aforementioned problems. More concretely, an object of the present invention is to prevent interference of a downlink (DL) of a base station to which a relay station belongs when the relay station transmits data in the DL. Another object of the present invention is to prevent interference of a downlink (DL) of another relay station within a base station or adjacent base stations when the base station transmits data to one relay station in the DL. Still another object of the present invention is to transmit backhaul data to a relay station by a base station with using uplink (UL) resource when DL resource is not sufficient, and is to prevent interference of a UL of a terminal due to the UL resource. Yet still another object of the present invention is to transmit data to a base station by a terminal or a relay station with using DL resource when UL resource is not sufficient, and is to prevent interference of a DL of an adjacent base station due to the DL resource.

To achieve these and other advantages and in accordance with the purpose of the present invention, as embodied and broadly described herein, there is provided a method for avoiding interference resulting from data transmission between an adjacent second base station and a second relay station placed within the coverage of the adjacent second base station, the method comprising: receiving radio resource scheduling information from the adjacent second base station; checking radio resources used in data transmission between the adjacent second base station and the second relay station based on the received radio resource scheduling information; and scheduling at least one radio resource among uplink radio resources and downlink radio resources for at least one first terminal and at least one first relay station which are connected to a first base station in order to avoid interference with the confirmed radio resource if the radio resource used in the data transmission from the second base station to the second relay station is checked as the uplink resource or of the radio resource used in the data transmission from the second relay station to the second base station is checked as the downlink resource.

To achieve these and other advantages and in accordance with the purpose of the present invention, as embodied and broadly described herein, there is also provided a method for avoiding interference resulting from data transmission between an adjacent second base station and a second relay station placed within the coverage of the adjacent second base station, the method comprising: receiving radio resource scheduling information from the adjacent second base station; checking radio resources used in data transmission between the adjacent second base station and the second relay station based on the received radio resource scheduling information; and calculating an interference level due to the data transmission between an adjacent second base station and a second relay station; and scheduling at least one radio resource among uplink radio resources and downlink radio resources for at least one first terminal and at least one first relay station which are connected to a first base station in order to avoid interference with the checked radio resource if the interference level is more than a preset threshold value.

In each step of scheduling, if the checked radio resource is a subframe of a TDD mode, one or more subframes rather than the subframe corresponding to the checked radio resource may be allocated to at least one first terminal and at least one first relay station connected to the first base station.

In each step of scheduling, if the checked radio resource is a specific band of an FDD mode, resource allocation may be performed so that the specific band is not used by at least one first terminal and at least one first relay station connected to the first base station at a time point when data is being transmitted or received between the adjacent second base station and the second relay station.

Each of the methods may further comprise calculating an interference level with at least one of the adjacent second base station and the second relay station. Here, each step of scheduling may be executed when the interference level is more than a preset threshold value.

Each of the methods may further comprise feeding-back information on the interference level to the adjacent second base station.

Each of the methods may further comprise transmitting a signal or message for requesting to control transmission power of the adjacent second base station.

Each of the methods may further comprise receiving a reference signal from the adjacent second base station. Here, the interference level may be calculated by using the reference signal.

Each of the methods may further comprise acquiring information for decoding data transmitted/received between the adjacent second base station and the second relay station; if the data between the adjacent second base station and the second relay station is simultaneously received with data from one of the first terminal and the first relay station, decoding data between the adjacent second base station and the second relay station based on the decoding information; and removing the decoded data between the adjacent second base station and the second relay station thereby to acquire only the data transmitted from one of the first terminal and the first relay station.

Each of the methods may further comprise acquiring information for decoding data transmitted/received from the second relay station to the second relay station if the radio resource used for data transmission from the second relay station to the second relay station is DL radio resource; and transmitting the information for decoding to the first terminal and the first relay station so that the first terminal decodes data transmitted to the first terminal and the first relay station from the first base station in a separate manner from data transmitted to the second relay station from the second relay station.

The steps may be executed by the first base station, or by a control station of the first base station.

To achieve these and other advantages and in accordance with the purpose of the present invention, as embodied and broadly described herein, there is still also provided a method for avoiding interference, the method comprising: transmitting a reference signal by a first base station; receiving, by the first base station, feedback information measured by an adjacent second base station with respect to the reference signal; controlling, by the first base station, transmission power of data transmitted/received between the first base station and a relay station placed within the coverage of the first base station, into a level not causing interference with radio resource of the second base station, based on the feed back information; and transmitting, by the first base station, the data to the relay station placed within the coverage of the first base station with the controlled transmission power.

The present invention may reduce interference occurring when signals are exchanged among the base station, the relay station and the terminals.

Especially, in the present invention, the base station may transmit backhaul data to the relay station with using UL resources due to deficient DL resources, etc. This may reduce the influence of interference on the adjacent base station.

Furthermore, in the present invention, the relay station may transmit backhaul data to the base station with using DL resources due to deficient UL resources, etc. This may reduce the influence of interference on the adjacent base station.

MODES FOR CARRYING OUT THE PREFERRED EMBODIMENTS

Figure 1:
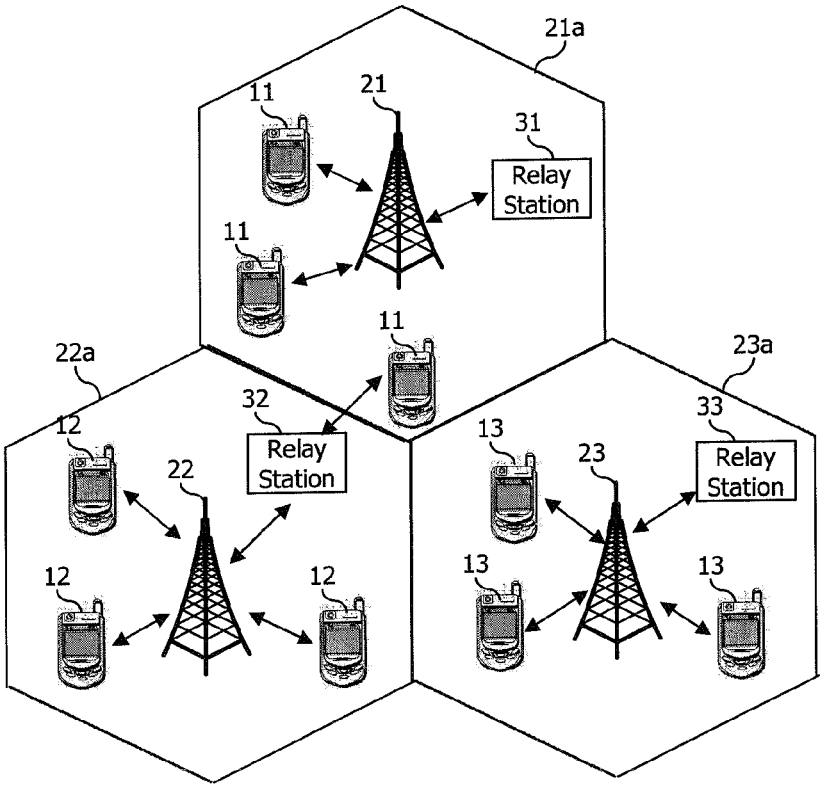
FIG. 1 illustrates a radio communications system using relay stations.
Figure 2:
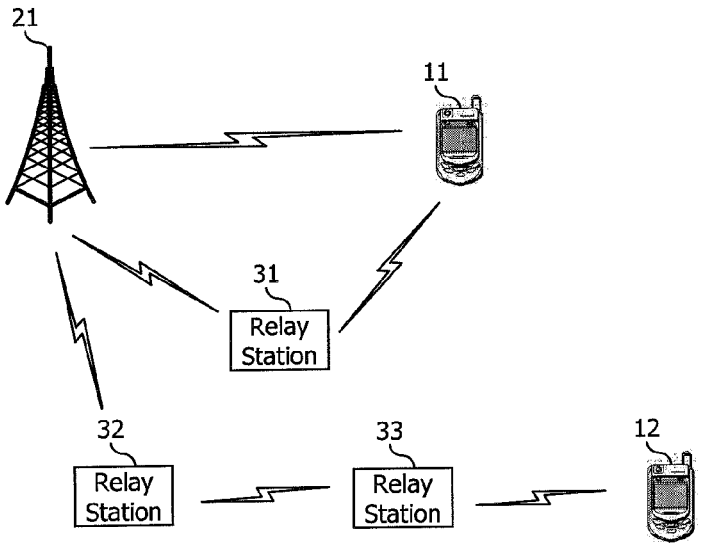
FIG. 2 illustrates that a base station performs communications with terminals via relay stations.
Figure 3:
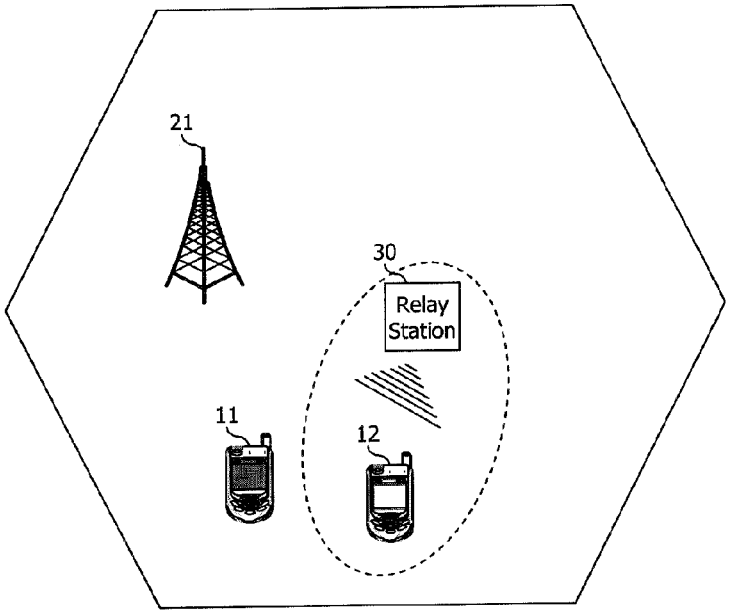
FIGS. 3 and 4 illustrate the influence of interference due to the introduction of relay stations.
Figure 3:
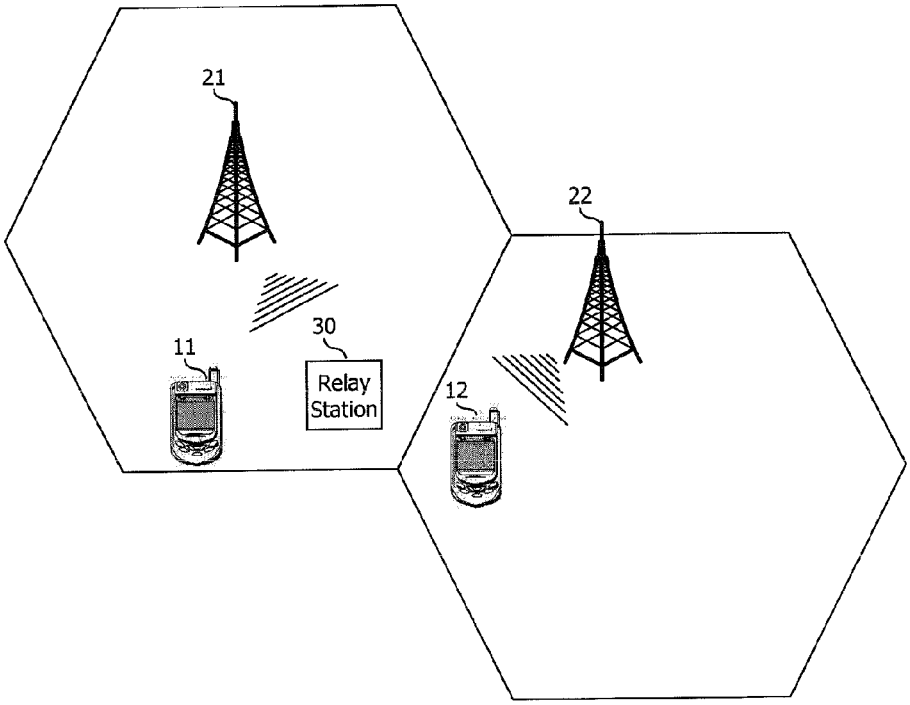
Figure 4:
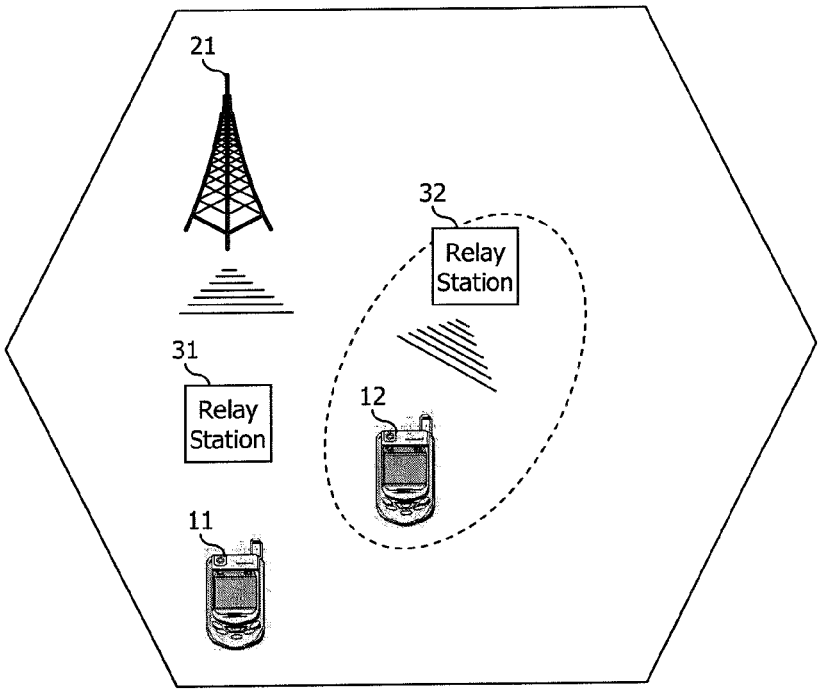

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

When it is mentioned that one component is "connected" or "accessed" to another component, it may be understood that the one component is directly connected or accessed to the another component or that still other component is interposed between the two components. In the meantime, when it is mentioned that one component is "directly connected" or "directly accessed" to another component, it may be understood that no component is interposed therebetween.

Hereinafter, preferred embodiments of the present invention will be explained in more detail with reference to the attached drawings. The same or similar components of one embodiment as or to those of another embodiment will be provided with the same or similar reference numerals, and their detailed explanations will be omitted. And, if it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents Hereinafter, the term of a terminal will be used. This terminal may be referred to as a UE (User Equipment), an ME (Mobile Equipment), an MS (Mobile Station), a UT (User Terminal), an SS (Subscriber Station), a wireless device, a handheld device and an AT (Access Terminal). And, the terminal may be a portable device such as a portable phone, a PDA, a smart phone, a wireless modem and a notebook, or may be an unportable device such as a PC and a vehicle-mounted device.

The present invention illustrated in the drawings may be implemented by TDMA, CDMA, CDMA2000, WCDMA, OFDMA, etc.

The TDMA (time division multiple access) may be implemented by radio technologies such as GSM (Global System for Mobile communications)/GPRS (General Packet Radio Service)/EDGE (Enhanced Data Rates for GSM Evolution). The CDMA 2000 refers to a CDMA (code division multiple access)-based radio technology. The WCDMA (Wideband CDMA) may be implemented by radio technologies such as UTRAN (Universal Terrestrial Radio Access Network) by a 3GPP (3rd Generation Partnership Project) standardization organization. The OFDMA (orthogonal frequency division multiple access) may be implemented by radio technologies such as IEEE 802.11 (Wi-Fi), IEEE 802.16 (WiMAX), IEEE 802-20 and E-UTRAN (Evolved-UTRAN). The LTE (long term evolution) is part of E-UMTS (Evolved-UMTS) using E-UTRAN, which adopts an OFDMA on a downlink but adopts an SC-FDMA (single carrier frequency division multiple access) on an uplink. The LTE-A (Advanced) is a form evolved from the LTE.

Downlink resource used in the present invention indicates a DL band in an FDD system, and indicates a DL subframe in a TDD system. And, uplink resource used in the present invention indicates a UL band in an FDD system, and indicates a UL subframe in a TDD system.

Figure 5:
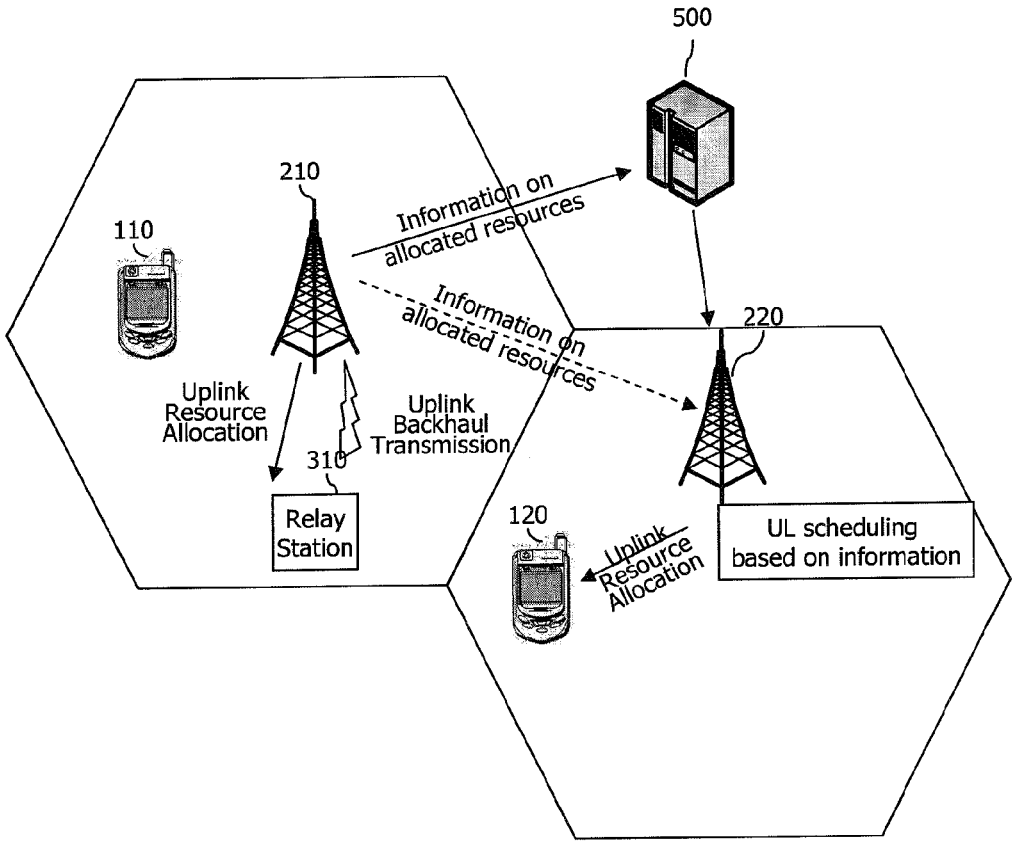
FIG. 5 is an exemplary view of a first embodiment of the present invention.

FIG. 5 is an exemplary view illustrating a first embodiment of the present invention.

As can be seen from FIG. 5, a first base station 210 and a second base station 220 are adjacent to each other. A first relay station 310 is positioned at an outer periphery of the coverage of the first base station 210. And, a first terminal 110 is placed within the coverage of the first base station 210, and a second terminal 120 is placed within the coverage of the second base station 220. The first base station 210 and the second base station 220 are controlled by a control station 500 (e.g., RNC or SGSN of UTRAN, or MME (Mobility Management Entity) or Serving-GW of EPC (Evolved Packet Core), or IEEE 802.16dml ASN-GW or CSN).

An entity in the first base station 210 schedules UL radio resources and DL radio resources. Alternatively, the control station 500 schedules UL radio resources and DL radio resources of the first base station 210.

The first base station 210 transmits, to the first relay station 310, information on the scheduled resources. Based on the received information, the first relay station 310 transmits UL backhaul data allocated thereto.

The first base station 210 also transmits, to the control station 500, the information on the scheduled resources. Then, the control station 500 transmits the information to the second base station 220. Alternatively, the first base station 210 may transmit the information on the scheduled resources to the second base station 220 in a wired or wireless manner.

Then, the second base station 220 identifies (checks) the UL resources through which the backhaul data is transmitted by the first relay station 310, based on the radio resource information of the first base station 210. And, the second base station 220 schedules its UL resources with avoiding interference, based on the identified UL resources. More concretely, the second base station 220 calculates an interference level based on the identified UL resources. If the interference level is more than a preset threshold value, the second base station 220 schedules its UL resources with avoiding the interference. Alternatively, if the interference level is less than the preset threshold value, the second base station 220 may schedule its UL resources with avoiding the interference.

For instance, the second base station 220 may not allocate its radio resources corresponding to a time point when the backhaul data is transmitted, to the second terminal 120 or the relay station. Alternatively, the second base station 220 may allocate its radio resources to the second terminal 120 or the relay station so as to prevent overlap with the identified UL resources. And, the second base station 220 may transmit information on the allocated radio resources to the second terminal 120.

Instead of avoiding the interference through scheduling, the second base station 220 may remove backhaul data of the first relay station 310 upon reception of data from the second terminal 120 and the backhaul data of the first relay station 310. For this, the second base station 220 exchanges, with the first base station 210, a control signal such as radio resource information on the backhaul data, modulation and coding schemes for the backhaul data, a pre-coding matrix index, and a reference signal for demodulation. The second base station decodes the backhaul data, and removes corresponding interference. Then, the second base station decodes all of the data from the second terminal 120 and the backhaul data.

Alternatively, upon receipt of the backhaul data of the first relay station 310, the first base station 210 decodes the backhaul data and transfers relevant data to the second base station 220. Then, the second base station 220 may remove interference by the backhaul data.

Figure 6:
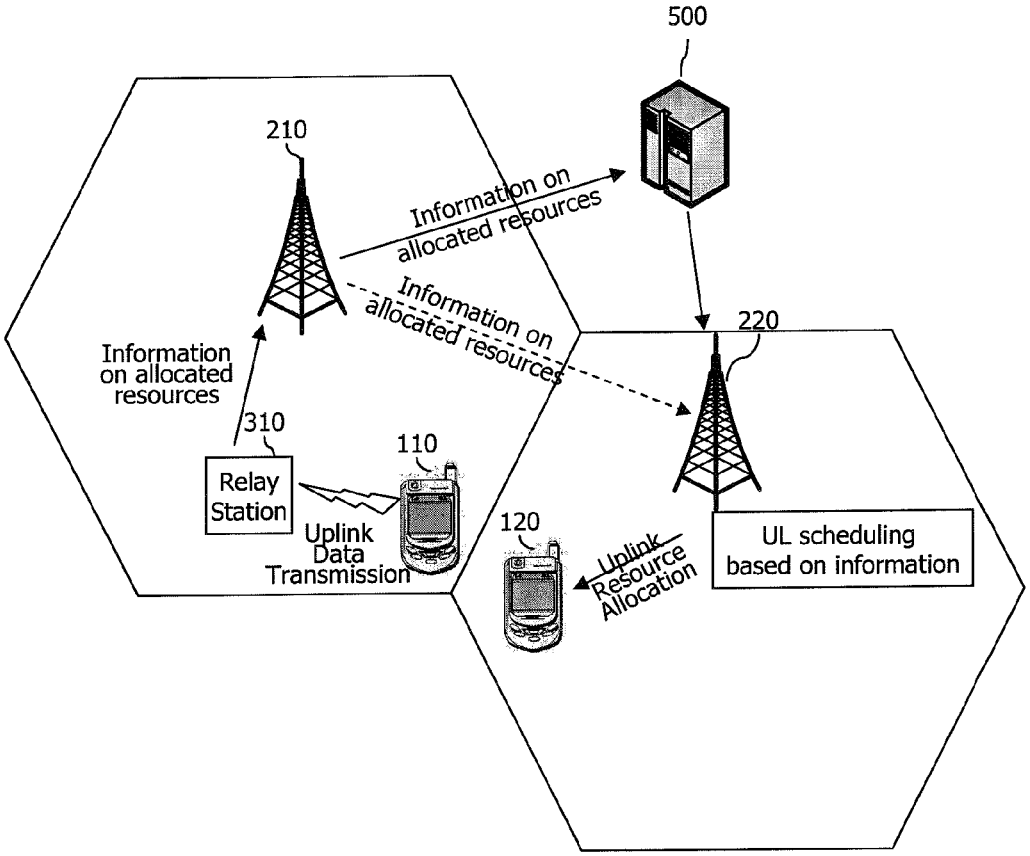
FIG. 6 is an exemplary view of a second embodiment of the present invention.

FIG. 6 is an exemplary view of a second embodiment of the present invention.

As can be seen from FIG. 6, a first base station 210 and a second base station 220 are adjacent to each other. A first relay station 310 is positioned at an outer periphery of the coverage of the first base station 210. And, a first terminal 110 is placed within the coverage of the first base station 210, and a second terminal 120 is placed within the coverage of the second base station 220.

The first base station 210 schedules UL radio resources and DL radio resources.

A method for scheduling radio resources of the first relay station 310 includes a center-concentrated scheduling method and a distribution-type scheduling method. According to the center-concentrated scheduling method, the first base station 210 directly allocates radio resources of the first relay station. On the other hand, according to the distribution-type scheduling method, the first base station 210 schedules radio resources to the first relay station 310. Then, the first relay station 310 allocates radio resources to the first terminal 110 which belongs thereto, based on the allocated radio resources.

According to the center-concentrated scheduling method, the first base station 210 directly allocates radio resources of the first terminal 110 which belongs to the relay station 310. Therefore, information on the allocated radio resources may be transmitted to the second base station 220 via the control station 500, or may be directly transmitted to the second base station 220.

According to the distribution-type scheduling method, the first relay station 310 allocates radio resources to the first terminal 110 based on radio resources allocated thereto, and transmits information on the allocated radio resources to the first base station 210. Then, the first base station 210 transmits the information on the radio resources to the second base station 220 via the control station 500, or directly transmits the information to the second base station 220.

The first terminal 110 transmits, data to the relay station 310, with using UL radio resources among the allocated radio resources.

Then, the second base station 220 identifies the UL resources through which the first terminal 110 transmits the data, based on information on the received radio resource. And, the second base station 220 schedules its UL resources based on the identified UL resources. For instance, the second base station 220 may not allocate its radio resources corresponding to a time point when data of the first terminal 110 is transmitted, to the second terminal 120 or other relay station. Alternatively, the second base station 220 may allocate its radio resources to the second terminal 120 or the relay station so as to prevent overlap with the identified UL resources. And, the second base station 220 may transmit the information on the allocated radio resources to the second terminal 120.

As aforementioned, in the present invention, the first base station and the second base station are interworked with each other. This may prevent interference.

Figure 7:
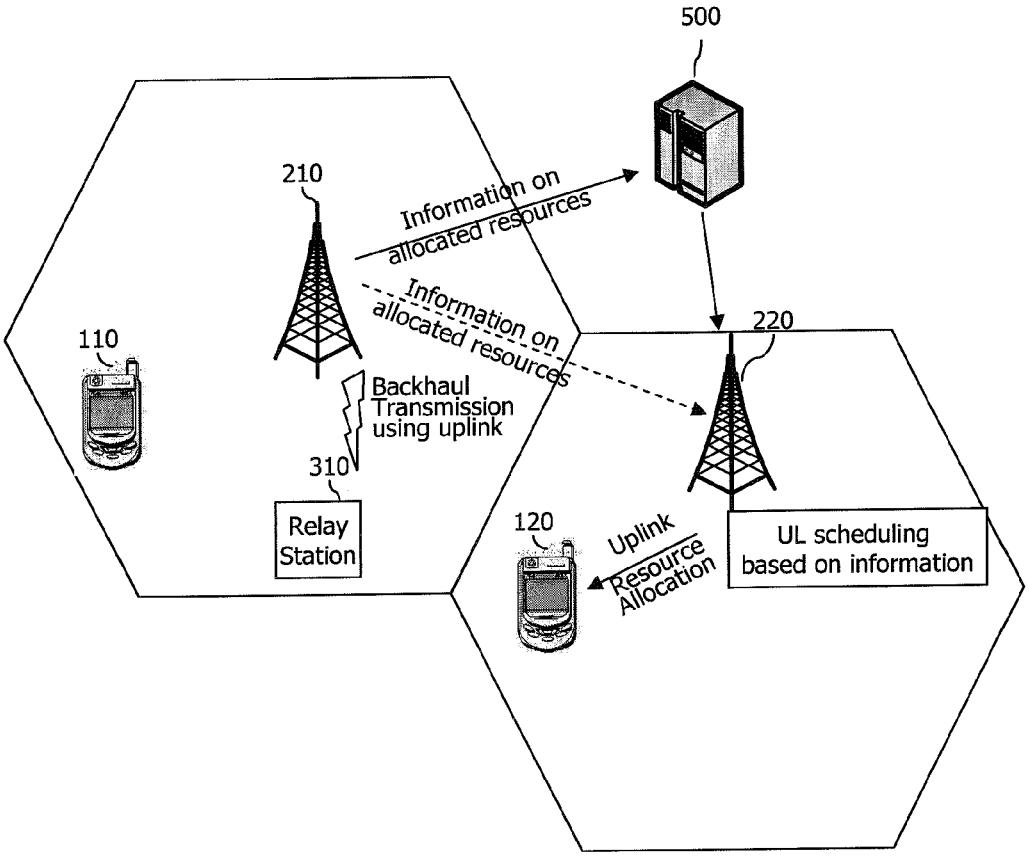
FIG. 7 is an exemplary view of a third embodiment of the present invention.
Figure 8:
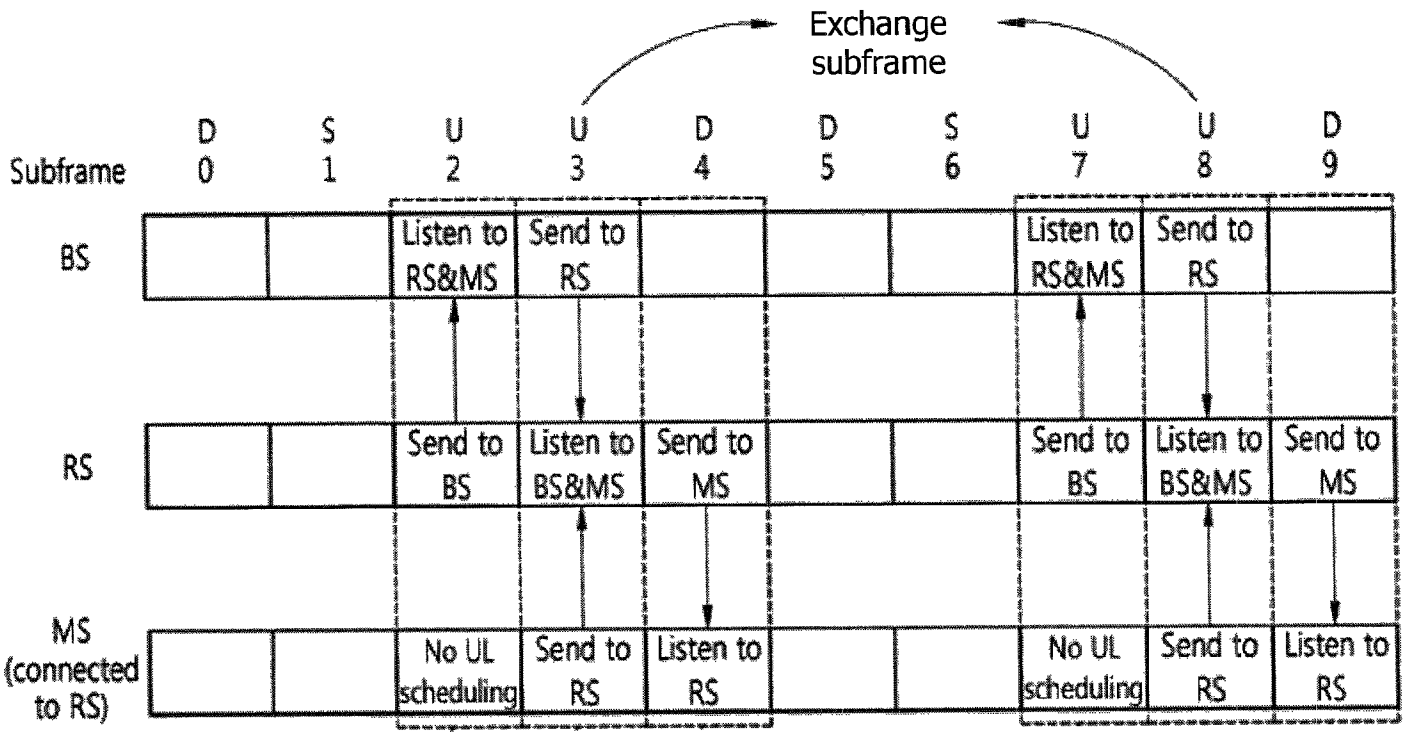
FIG. 8 illustrates an example of a TDD frame structure according to a third embodiment of the present invention.

FIG. 7 is an exemplary view of a third embodiment of the present invention, and FIG. 8 illustrates an example of a TDD frame structure according to a third embodiment of the present invention.

As can be seen from FIG. 7, a first base station 210 and a second base station 220 are adjacent to each other. A first relay station 310 is positioned at an outer periphery of the coverage of the first base station 210. And, a first terminal 110 is placed within the coverage of the first base station 210, and a second terminal 120 is placed within the coverage of the second base station 220.

The first base station 210 schedules UL radio resources and DL radio resources. Alternatively, the control station 500 may schedule UL radio resources and DL radio resources of the first base station 210.

In some cases (e.g., when DL resources are deficient), the first base station 210 may transmit backhaul data to the first relay station 310 with using the UL resources. This may be referred to as UL subframe stealing in a TDD system, and as UL band stealing in an FDD system.

More specifically, as can be seen from FIG. 8, one frame includes 10 subframes, 'ID' indicates DL subframes, 'U' indicates UL subframes, and 'S' indicates specific subframes.

The subframes within the frame may have the following 7 (0~6) configuration schemes as shown in the following Table 1.

TABLE 1

| Configurations of UL and DL | Time period for switching UL with respect to DL | Subframe number 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the configurations of 0~2, UL and DL are switched form each other with a switching point period of 5 ms. And, in the configurations of 3~6, UL and DL are switched from each other with a switching point period of 10 ms.

FIG. 8 illustrates the first UL-DL configuration of Table 1. Referring to the first configuration, the $3^{rd}$ subframe and the $8^{th}$ subframe are UL subframes. However, the subframes may be exchange subframes or stolen subframes as shown in FIG. 8 according to the third embodiment of the present invention. The exchange subframe is designated as a UL subframe for data transmission from the base station to the terminal in a TDD system, which indicates a subframe used to transmit data from the base station to the relay station by establishing (designating) at least one of UL subframes through dynamic or static allocations. The exchange subframes or the stolen subframes may be partially or entirely used to transmit data to the relay station by the base station. The subframe used for a changed purpose even if it was originally used as a UL subframe may be referred to as exchange subframe or stolen subframe.

Therefore, the first base station 210 may transmit backhaul data to the first relay station 310 on the $3^{rd}$ and $8^{th}$ subframes. And, the first relay station 310 may receive data transmitted from the first terminal 110 on the $3^{rd}$ and $8^{th}$ subframes. Here, data received from the first terminal 110 and data received from the first base station 210 may be different from each other. And, the respective data may be received through different resources.

Although not shown, in an assumption that a UL band is 'f1' and a DL band is 'f2' in an FDD system, the first base station 210 generally receives data on the 'f1' through listening, and transmits data on the 'f2'. However, if the 'f2' is not sufficient, the first base station 210 may transmit backhaul data with using the 'f1' on some subframes.

In the case where the first base station 210 transmits backhaul data on the UL subframe or UL band, a transmission signal of the first base station 210 may cause interference with UL transmission of the second terminal 120 which belongs to the adjacent second base station 220.

In order to solve the interference, the first base station 210 transmits information on the scheduled resources to the first relay station 310. And, the first base station 210 also transmits the information on the scheduled resources to the control station 500. Then, the control station 500 transmits the information to the second base station 220. Alternatively, the first base station 210 may transmit the information on the scheduled resources to the second base station 220 in a wired or wireless manner.

In order to avoid the interference, the second base station 220 identifies the UL resources through which the backhaul data is transmitted, based on the radio resource information of the first base station 210. And, the second base station 220 schedules its UL resources, based on the identified UL resources. For instance, the second base station 220 may not allocate its radio resources corresponding to a time point when the backhaul data is transmitted, to the second terminal 120 or the relay station. Alternatively, the second base station 220 may allocate its radio resources to the second terminal 120 or the relay station so as to prevent overlap with the identified UL resources. And, the second base station 220 may transmit information on the allocated radio resources to the second terminal 120.

Instead of avoiding the interference through scheduling, the second base station 220 may remove backhaul data of the first relay station 310 upon reception of data from the second terminal 120 and the backhaul data of the first relay station 310. For this, the second base station 220 exchanges, with the first base station 210, control data such as radio resource information on the backhaul data, modulation and coding schemes for the backhaul data, a pre-coding matrix index, and a reference signal for demodulation. The second base station decodes the backhaul data, and removes corresponding interference. Then, the second base station decodes the data from the second terminal 120.

As another example to avoid the interference, the first base station 210 may control transmission power of the backhaul data transmitted in the UL. For this, the first base station 210 may transmit a reference signal to neighboring base stations, i.e., the second base station 220. And, the second base station 220 may measure an interference level (interference degree) from the reference signal, and may feedback the measured interference level to the first base station 210. Here, the second base station 220 may transmit, to the first base station 210, a signal or message requiring for increase or decrease of transmission power. Alternatively, the second base station 220 may feedback interference headroom corresponding to a difference between a limit value of interference which can be received thereby, and a substantial interference level received from the first base station.

Alternatively, for notification of transmission power, the first base station 210 may transmit a reference signal, and the second base station 220 may perform feedback by measuring a path loss of the backhaul signal from reception power of the reference signal. The reference signal may be periodically transmitted on predetermined time/frequency resources, and may be a specific sequence determined by an ID of the first base station. The first base station and the second base station may exchange information on period/position of the reference signal from each other. Specifically, the reference signal transmitted to the second base station by the first base station may be transmitted to UL resources (UL frequencies in case of FDD, and UL subframes in case of TDD).

The signal exchange between the first base station and the second base station may be performed through the control station 500, or may be directly performed through a wired or wireless link.

Even if the first base station 210 transmits the backhaul signal with transmission power determined based on the feedback information of the second base station 220 or required transmission power, the first relay station 310 may not correctly receive the backhaul signal since the first relay station 310 is far from the first base station 210. In this case, the first base station 210 may temporarily stop transmitting the backhaul data, thereby preventing interference on the neighboring base stations.

The second base station 220 may select one of the aforementioned methods for avoiding interference according to an interference strength. For instance, when the backhaul signal has a high strength, the second base station 220 may remove the backhaul signal after a decoding process. Alternatively, when the backhaul signal has a strength not enough to perform a decoding process, but high enough to greatly interfere with data from the second terminal 120, the second base station 220 may transmit a signal to the first base station, the signal requesting for decrease of transmission power of the backhaul signal.

Still alternatively, the second base station 220 may select one of the aforementioned methods for avoiding interference according to the amount of its UL traffics. For instance, when the amount of data traffics is not great, the second base station may avoid interference through the scheduling. And, when the amount of data traffics is increased, the second base station may be operated by switching the current method into another method (e.g., a method for decoding data of the second terminal after removing interference of the backhaul signal).

Figure 9:
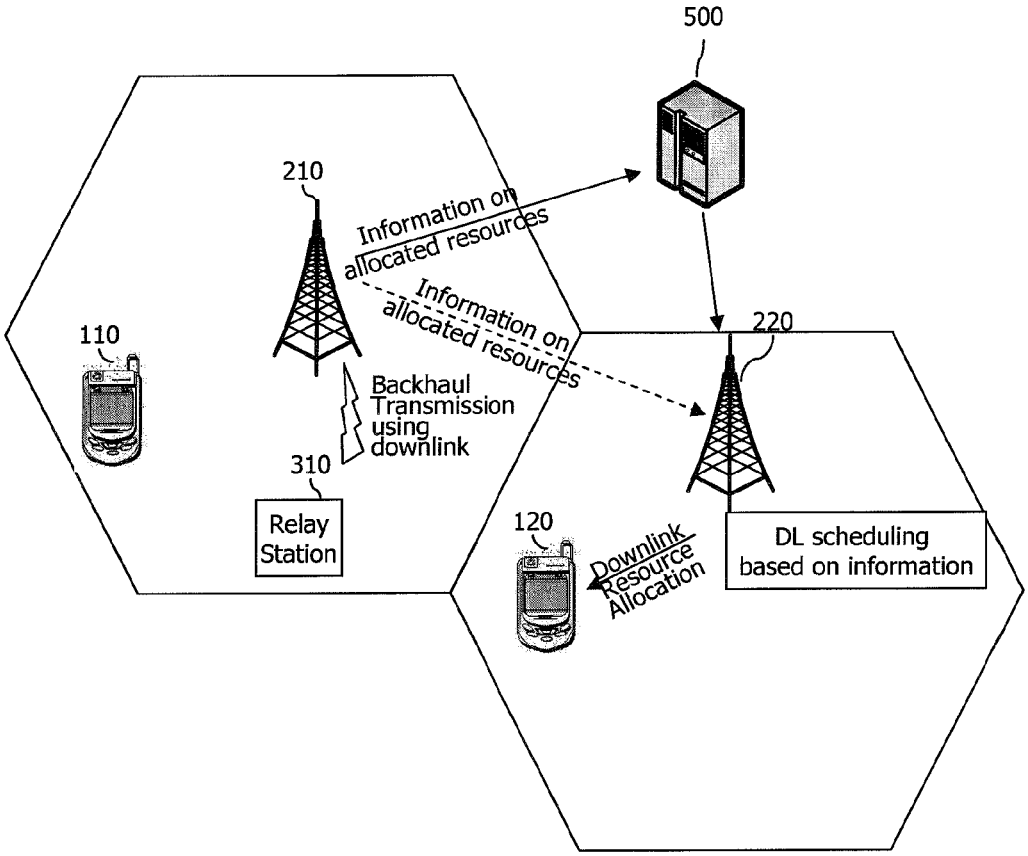
FIG. 9 is an exemplary view of a fourth embodiment of the present invention.

FIG. 9 is an exemplary view of a fourth embodiment of the present invention.

Referring to FIG. 9, in a similar manner to FIG. 8, the first relay station 310 may transmit backhaul data to the first base station 210 in some cases (e.g., when UL resources are deficient). Data transmission by the relay station with using DL resources may be referred to as DL band stealing or DL subframe stealing.

In this case, a transmission signal of the first relay station 310 may cause interference with DL transmission to the second terminal 120 by the adjacent second base station 220.

In order to solve the interference, in the fourth embodiment, the second base station 220 identifies the DL resources through which the backhaul data is transmitted, in a similar manner to the third embodiment. And, the second base station 220 schedules its DL resources, based on the identified DL resources. For instance, the second base station 220 may not allocate its radio resources corresponding to a time point when the backhaul data is transmitted, to the second terminal 120 or the relay station. Alternatively, the second base station 220 may allocate its radio resources to the second terminal 120 or the relay station so as to prevent overlap with the identified DL resources. And, the second base station 220 may transmit information on the allocated radio resources to the second terminal 120.

Instead of avoiding the interference through scheduling, the second base station 220 may acquire control data from the first base station 210, such as radio resource information on the backhaul data, modulation and coding schemes for the backhaul data, a pre-coding matrix index, and a reference signal for demodulation. And, the second base station provides the acquired information to the second terminal 120.

Upon receipt of all of the data from the second base station 120 and the backhaul data from the first base station 110, the second terminal 120 may decode the backhaul data based on the information, and may remove the backhaul data from the received data.

If the system illustrated in FIG. 9 is a TDD system, UL/DL configurations used by the first relay station and the base station may be different from each other. For instance, the first relay station transmits a backhaul signal through its DL subframe. In this case, the DL subframe may correspond to a UL subframe in the position of the first base station 210 or the second base station 220. More concretely, when the DL subframe through which the backhaul signal is transmitted corresponds to a UL subframe in the position of the first base station 210 or the second base station 220, transmission of the backhaul data by the relay station may cause interference with the UL of the second base station 220.

Also, the transmission by the relay station may be greatly interfered by UL transmission of neighboring cells. This interference may be solved by the operation of FIG. 7. Therefore, details thereof will not be additionally explained, but will be based on FIG. 7.

In addition, the above various embodiments may be implemented by using, computer software, hardware, or some combination thereof. For instance, the method of the present invention may be stored in a storage medium (e.g., volatile memory, non-volatile memory (e.g., flash memory), hard disc, etc.), or may be implemented in codes or commands inside a software program that can be executed by a processor.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

[1. A method for avoiding interference resulting from data transmission between a neighboring base station (BS) and a neighboring relay station (RS) placed within the coverage of the neighboring BS, the method performed by a base station (BS), or by a control station of the BS and comprising:

receiving information for decoding neighboring data transmitted/received between the neighboring BS and the neighboring RS from the neighboring BS, wherein the information for decoding neighboring data includes radio resource scheduling information for the neighboring data, modulation and coding schemes for the neighboring data, a pre-coding matrix index for the neighboring data and a reference signal for demodulating the neighboring data;

if the neighboring data is simultaneously received with data transmitted from a terminal which is connected to the BS, decoding the neighboring data based on the information for decoding the neighboring data; and removing interference corresponding to the decoded neighboring data from data received through an uplink to acquire the data transmitted from the terminal.]

[2. The method of claim 1, further comprising:

if a checked radio resource for the neighboring data is a subframe of a Time Division Duplex (TDD) mode, allocating one or more subframes rather than the subframe corresponding to the checked radio resource to at least one first terminal and at least one RS connected to the BS.]

[3. The method of claim 1, further comprising:

if a checked radio resource for the neighboring data is a specific band of a Frequency Division Duplex (FDD) mode, performing resource allocation so that the specific band is not used by at least one terminal and at least one RS connected to the BS at a time point when data is being transmitted or received between the neighboring BS and the neighboring RS.]

[4. The method of claim 1, further comprising:

calculating an interference level with at least one of the neighboring BS and the neighboring RS.]

[5. The method of claim 4, further comprising:

feeding-back information on the interference level to the neighboring BS.]

[6. The method of claim 1, further comprising:

transmitting a signal or message for requesting to control transmission power of the neighboring BS.]

[7. The method of claim 1, further comprising:

receiving a reference signal from the neighboring BS, wherein the interference level is calculated by using the reference signal.]

[8. The method of claim 1, further comprising:

acquiring information for decoding data transmitted/received from the neighboring BS to the neighboring RS, if the radio resource used for data transmission from the neighboring BS to the neighboring RS is a downlink radio resource; and transmitting the information for decoding data to the terminal so that it is possible for the terminal to discern and decode data transmitted to the terminal from the BS from data transmitted to the neighboring BS from the neighboring RS.]

[9. The method of claim 1, further comprising:

if the radio resource for the neighboring data is a subframe of a Time Division Duplex (TDD) mode, allocating one or more subframes other than the subframe corresponding to the radio resource for the neighboring data to the terminal.]

[10. The method of claim 1, further comprising:

if the radio resource for the neighboring data is a specific band of a Frequency Division Duplex (FDD) mode, allocating a frequency band other than the specific band which is not used by the terminal at a time point when data is being transmitted or received between the neighboring BS and the neighboring RS.]

[11. A method for avoiding interference resulting from data transmission between a neighboring base station (BS) and a neighboring relay station (RS) placed within the coverage of the neighboring BS, the method performed by a base station (BS) or by a control station of the BS and comprising:

receiving information for decoding neighboring data transmitted/received between the neighboring BS and the neighboring RS from the neighboring BS, wherein the information for decoding neighboring data includes radio resource scheduling information for the neighboring data, modulation and coding schemes for the neighboring data, a pre-coding matrix index for the neighboring data and a reference signal for demodulating the neighboring data;

calculating an interference level due to data transmission between the neighboring BS and the neighboring RS; and if the interference level is higher than a preset threshold, decoding the neighboring based on the information for decoding the neighboring data; and removing interference corresponding to the decoded neighboring data from data received through an uplink to acquire the data transmitted from a terminal which is connected to the BS.]

*12. A method for reducing interference to a neighbor base station (BS), the method performed by a base station (BS) and comprising:*

*transmitting, by the BS to the neighbor BS, resource information indicating at least one uplink (UL) subframe in which the BS uses to transmit backhaul data other than UL data, and information for decoding the backhaul data;*

*transmitting a reference signal for demodulation of the backhaul data to the neighbor BS; and*

*receiving, by the BS from the neighbor BS, an interference value measured in the at least one UL subframe,*

*wherein the information for decoding the backhaul data includes modulation and coding schemes for the backhaul data and a pre-coding matrix index for the backhaul data,*

*wherein the information for decoding the backhaul data is used by the neighbor BS to decode the backhaul data,*

*wherein the resource information is used by the neighbor BS when the neighbor BS schedules, and*

*wherein when the backhaul data is received by the neighbor BS simultaneously with data transmitted from a terminal connected to the neighbor BS, the backhaul data is decoded by the neighbor BS based on the information for decoding the backhaul data, and the data transmitted from the terminal is obtained by the neighbor BS by removing the interference corresponding to the decoded backhaul data from data received through the UL.*

*13. The method according to claim 12, wherein the at least one UL subframe has a subframe number 3 or 8 in an uplink-downlink (UL-DL) configuration.*

*14. The method according to claim 12, further comprising:*

*receiving a message for requesting the BS to reduce or increase transmission power in the at least one UL subframe.*

*15. The method according to claim 12, further comprising:*

*receiving interference power headroom which is a difference between a limitation value of interference which the neighbor BS stands and the interference value.*

*16. The method according to claim 12, wherein the received interference value is considered by the BS when the BS schedules.*

* * * * *